US008313370B2

(12) United States Patent
Rogers et al.

(10) Patent No.: US 8,313,370 B2
(45) Date of Patent: Nov. 20, 2012

(54) VIDEO GAME SYSTEMS AND METHODS FOR PROVIDING SOFTWARE-BASED SKILL ADJUSTMENT MECHANISMS FOR VIDEO GAME SYSTEMS

(75) Inventors: Henk B. Rogers, Honolulu, HI (US); Alexey L. Pajitnov, Clyde Hill, WA (US)

(73) Assignee: Tetris Holding LLC, Wilmington, DE (US)

( * ) Notice: Subject to any disclaimer, the term of this patent is extended or adjusted under 35 U.S.C. 154(b) by 479 days.

(21) Appl. No.: 12/550,854

(22) Filed: Aug. 31, 2009

(65) Prior Publication Data

US 2010/0144424 A1 Jun. 10, 2010

Related U.S. Application Data

(60) Provisional application No. 61/093,556, filed on Sep. 2, 2008.

(51) Int. Cl.
*A63F 9/24* (2006.01)
*A63F 13/00* (2006.01)

(52) U.S. Cl. ................................. 463/23; 463/7; 463/30

(58) Field of Classification Search ..................... 463/23, 463/7–11, 30
See application file for complete search history.

(56) References Cited

U.S. PATENT DOCUMENTS

| | | | | |
|---|---|---|---|---|
| 5,265,888 A | * | 11/1993 | Yamamoto et al. | 463/10 |
| 5,643,084 A | * | 7/1997 | Mirsky | 463/9 |
| 5,944,605 A | * | 8/1999 | Pajitnov | 463/9 |
| 5,971,850 A | * | 10/1999 | Liverance | 463/23 |
| 6,102,796 A | * | 8/2000 | Pajitnov et al. | 463/9 |
| 6,352,475 B1 | * | 3/2002 | Mraovic | 463/9 |
| 6,354,939 B1 | * | 3/2002 | Morita et al. | 463/1 |
| 6,358,148 B1 | * | 3/2002 | Tanaka | 463/23 |
| 6,398,641 B1 | * | 6/2002 | Yamagami et al. | 463/9 |
| 6,769,987 B1 | * | 8/2004 | Morita et al. | 463/31 |
| 6,827,645 B2 | * | 12/2004 | Morita et al. | 463/9 |
| 7,094,147 B2 | * | 8/2006 | Nakata et al. | 463/9 |
| 7,367,882 B2 | * | 5/2008 | Fukutome | 463/7 |

(Continued)

OTHER PUBLICATIONS

"Blockout" retreived from URL <http://en.wikipedia.org/wiki/Blockout> on Feb. 13, 2012, 4 pages.*

(Continued)

*Primary Examiner* — Dmitry Suhol
*Assistant Examiner* — Jason Skaarup
(74) *Attorney, Agent, or Firm* — Norris McLaughlin & Marcus, P.A.

(57) ABSTRACT

Video game systems and methods provide one or more software-based skill adjustment mechanisms for video game systems to adjust a difficulty level of the video games based on an existing skill level or game play of a player. The difficulty level of the video games is adjustable to correspond to an existing skill level of the player for removing digital blocks from a digital matrix, clearing digital complete horizontal lines from the digital matrix and/or avoiding game ending conditions. The difficulty level of the video game may be adjusted to facilitate skill-building game play for the player. The difficulty level of the video games is adjustable during game play that is approaching or leading to a game ending condition via software for one or more primary and/or secondary skill adjustment mechanisms. The one or more primary and/or secondary skill adjustment mechanisms include matrix dimension adjustments, line clear adjustments, level and fall speed adjustments, piece adjustments and/or a top-out, lock-out and/or block-out meter.

22 Claims, 5 Drawing Sheets

U.S. PATENT DOCUMENTS

| | | | |
|---|---|---|---|
| 7,425,175 B2* | 9/2008 | Nakano et al. | 463/11 |
| 7,717,781 B2* | 5/2010 | Hattori et al. | 463/9 |
| 7,775,866 B2* | 8/2010 | Mizuguchi et al. | 463/9 |
| 7,819,732 B2* | 10/2010 | Asuna et al. | 463/7 |
| 7,878,891 B2* | 2/2011 | Chiu | 463/9 |
| 8,105,153 B2* | 1/2012 | Buecheler et al. | 463/23 |
| 2003/0040350 A1* | 2/2003 | Nakata et al. | 463/9 |
| 2005/0043075 A1* | 2/2005 | Lin et al. | 463/9 |
| 2005/0266908 A1* | 12/2005 | Hattori et al. | 463/9 |
| 2005/0277456 A1* | 12/2005 | Mizuguchi et al. | 463/7 |
| 2006/0073863 A1* | 4/2006 | Hagiwara | 463/9 |
| 2007/0060338 A1* | 3/2007 | Kefaloukos et al. | 463/30 |
| 2008/0161079 A1* | 7/2008 | Wei | 463/9 |
| 2008/0266250 A1* | 10/2008 | Jacob | 345/156 |
| 2008/0268943 A1* | 10/2008 | Jacob | 463/23 |

OTHER PUBLICATIONS

"Tetris" retrieved from URL <http://web.archive.org/web/20070405204446/http://en.wikipedia.org/wiki/Tetris> on Feb. 13, 2012 and available on or before Apr. 5, 2007, 4 pages.*

"Welltris" retrieved from URL <http://en.wikipedia.org/wiki/Welltris> on Feb. 13, 2012, 2 pages.*

"Tetris Worlds" game manual for Microsoft XBOX, published by THQ on or before Sep. 2, 2008, 14 pages.*

"Tetris and Dr. Mario" game manual for Super Nintendo Entertainment System (SNES), published by Nintendo on or before Dec. 31, 1994, 17 pages.*

"Tetris 2" game manual for Super Nintendo Entertainment System (SNES), published by Nintendo on or before Dec. 31, 1994, 13 pages.*

"Tetris Plus" retrieved from URL <http://web.archive.org/web/20080611065538/en.wikipedia.org/wiki/Tetris_Plus> on Feb. 15, 2012 and available on or before Jun. 11, 2008, 2 pages.*

"Tetris Plus" images retrieved from URL <http://www.youtube.com/watch?v=mxl3-fFuvqA> on Feb. 13, 2012 and available on or before Sep. 2, 2008, 15 pages.*

"Tetris Attack" game manual for Super Nintendo Entertainment System (SNES), published by Nintendo on or before Dec. 31, 1996, 13 pages.*

"Tetris DS" game manual for Nintendo DS, published by Nintendo on or before Mar. 31, 2006, 20 pages.*

"Dynamic Difficulty Controlling Game System" written by Sang-Won et al., published in IEEE Transactions on Consumer Electronics, vol. 53, No. 2, May 2007, pp. 812-818.*

"Stacked Odds" retrieved from URL <http://web.archive.org/web/20080831022955/http://www.rrrrthats5rs.com/about/> on Feb. 15, 2012 and available on or before Aug. 31, 2008, pp. 1 to 12.*

"Tetris" game manual for Nintendo GameBoy, published by Nintendo on or before Dec. 31, 1989, 11 pages.*

"Tetris Plus" description written by Tetrisconcept.com and retrieved from URL <http://www.tetrisconcept.net/wiki/Tetris_Plus> on Feb. 17, 2012, 2 pages.*

"Lumines" game manual written by UBISOFT, available on or before Sep. 1, 2008, 8 pages.*

"Lumines II" game manual written by Buena Vista Games, available on or before Sep. 1, 2008, 9 pages.*

"Description of Tetris Plus" written by allgame, available on or before Sep. 1, 2008, retrieved from URL <http://www.allgame.com/game.php?id=7982>, 1 page.*

* cited by examiner

VIDEO GAME SYSTEMS AND METHODS FOR PROVIDING SOFTWARE-BASED SKILL ADJUSTMENT MECHANISMS FOR VIDEO GAME SYSTEMS

CROSS REFERENCE TO RELATED APPLICATION

This application claims the benefit of U.S. Provisional Application No. 61/093,556 filed Sep. 2, 2008, incorporated by reference herein.

BACKGROUND

1. Field of the Invention

The present disclose is related to video game systems and methods for providing one or more software-based skill adjustment mechanisms for video game systems. More specifically, the present disclosure is related to puzzle video game systems and methods for providing software-based skill adjustment mechanisms for puzzle video game systems to adjust a difficulty level of the video game systems based on a current skill level or game play of a player. The video game systems may provide assortments of digital blocks in a digital matrix in which the player may manipulate, organize and/or drop digital blocks for forming and clearing complete horizontal lines from the matrix to complete one or more difficulty levels. Failure by the player to remove complete horizontal lines from the matrix in a timely fashion may result in a game ending condition being committed or approached by the game play of the player. The video game systems may include software and/or algorithms for providing one or more software-based skill adjustment mechanisms which adjust the difficulty level of the video games when a game ending condition is committed or approached to avoid a game ending condition and/or termination of game play. As a result, the difficulty level of the video games may be adjusted based on the current skill level or game play of the player to remove the complete horizontal lines from the matrix, to avoid the game ending conditions and/or to prevent termination of game play.

The player may be unable to clear complete digital horizontal lines formed with the blocks at a speed that is equal to or greater than a fall speed of newly generated blocks introduced into the matrix. The game ending condition may occur (a) after one or more blocks are pushed or moved above a buffer zone of the digital matrix, (b) when one or more blocks locked down in the buffer zone prevent a new block from being generated and introduced into the digital matrix, or (c) at an expiration of a predetermined time limit. After an occurrence of a game ending condition or during play when the video game systems determine that the skill level and game play of the player is likely to lead to an occurrence of a game ending condition, the video game systems may execute one or more primary and/or secondary software-based skill adjustment mechanisms so an adjusted difficulty level of the video game matches or corresponds to the current skill level or game play of the player. The primary and/or secondary software-based skill adjustment mechanisms may include, for example, a matrix dimension adjustment, a line adjustment, a level and fall speed adjustment, a piece adjustment and/or a top-out, lock-out and/or block-out meter.

2. Description of the Related Art

Figure 1:
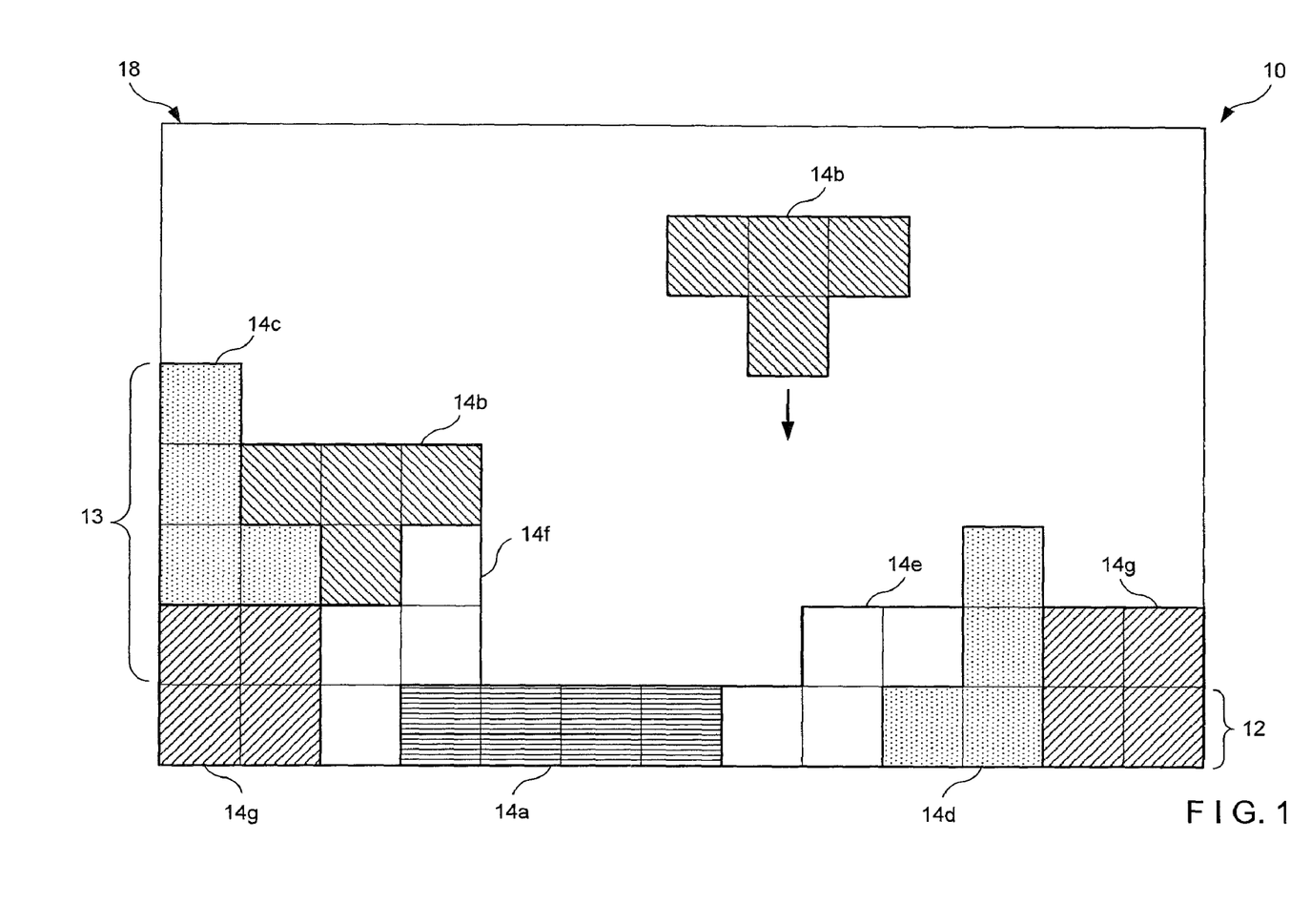
FIG. 1 illustrates a digital matrix having digital blocks therein in accordance with the present disclosure.
Figure 2:
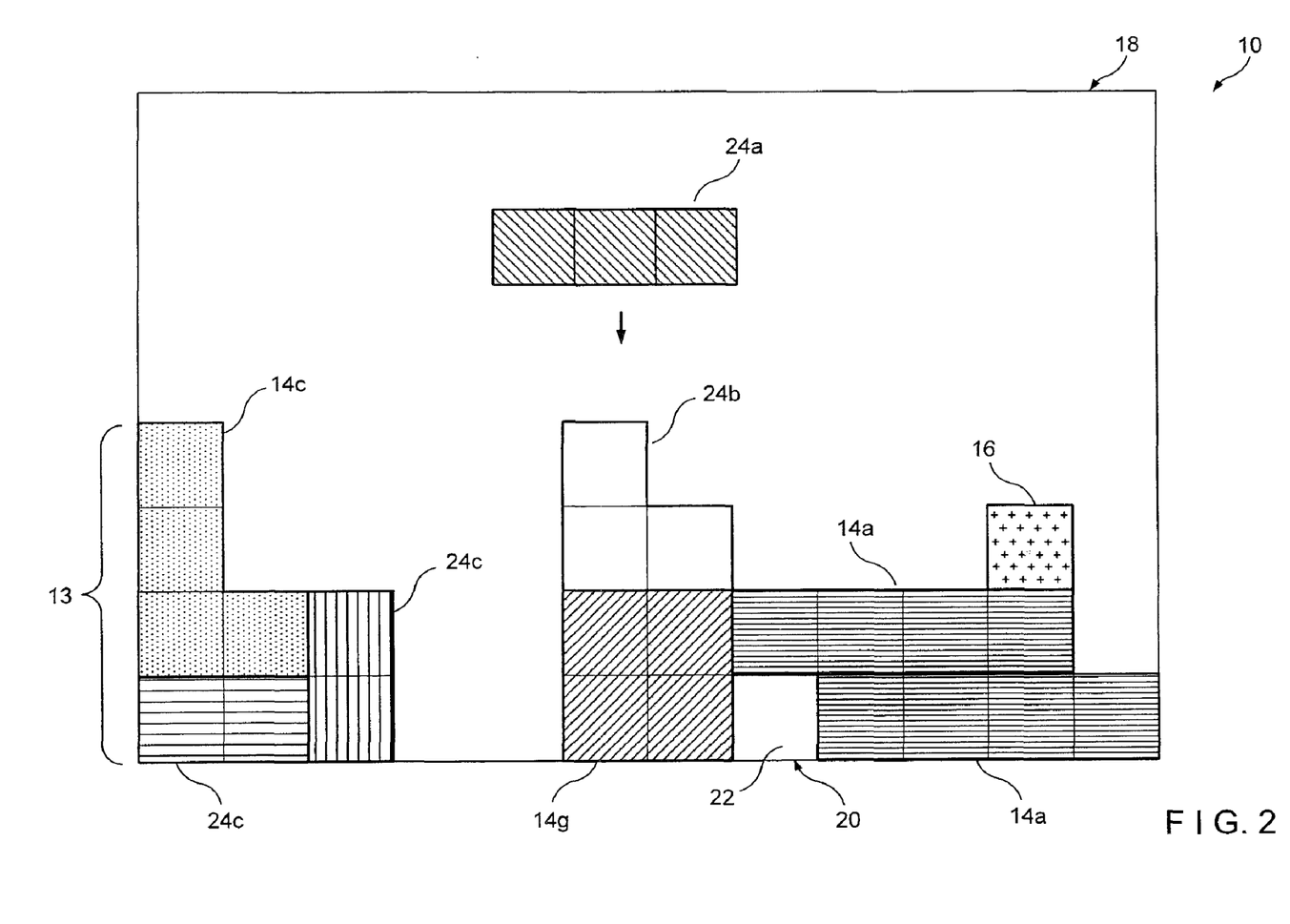
FIG. 2 illustrates a digital matrix having digital blocks therein in accordance with the present disclosure.

It is generally known, for example, that a puzzle video game, such as, for example, TETRIS®, the rights to which are owned by Tetris Holding, LLC, is played on a gaming device by one or more players and/or opponents. As shown in FIGS. 1 and 2, during game play of the video game, a player rotates, moves and drops different falling tetrimino blocks 14a-14g within a digital matrix 10 to arrange and organize the blocks 14a-14g into one or more complete horizontal lines 12, without any gaps or openings 22 within the horizontal lines. Tetrimino blocks 14a-14g are blocks composed of four connected squares or minos 16, in seven possible shapes. Once the player has placed a tetrimino block in a final resting position, the tetrimino block is locked down and unable to be subsequently moved and/or rotated. Additionally, the player may execute special actions, such as, block spins, block slots, block twists, floor kicks and/or wall kicks to position one or more tetrimino blocks into locations within the matrix 10.

Each complete horizontal line 12 is eliminated or cleared from the digital matrix 10. As a result, remaining blocks 14a-14g fall or move downward towards a bottom 20 of the digital matrix 10. It is also generally known that the tetrimino blocks 14a-14g are shapes consisting of the four individual smaller square blocks or minos 16. The blocks 14a-14g, minos 16 and/or matrix 10 is two-dimensional or three-dimensional.

The gaming device is comprised of a digital display and input device. The gaming device is, for example, a personal computer (hereinafter "PC"), a video gaming console, a handheld gaming device, an arcade gaming device or a hybrid gaming device. Alternatively, the gaming device may be a tablet PC, ultra-mobile PC, a mobile-based pocket PC, an electronic book computer, a laptop computer, a media player, a portable media device, a personal digital assistant, an enterprise digital assistant, a digital cable receiver, a graphic calculator, a Global Positioning System receiver, a digital audio player, a digital camera or a wrist watch. Moreover, the gaming device may be a mobile phone, a 4G mobile device, a 3G mobile device, an ALL-IP electronic device, an information appliance or a personal communicator.

The gaming device may provide the player with the ability to play the video game in an online mode or a non-online mode. In the online mode, the gaming device is connected to a fixed communication network or a wireless communication network so that the player may access information associated with the video game and/or play against one or more remote opponents via the fixed or wireless communication network. In the non-online mode, the gaming device is not connected to a wired or wireless communication network. As a result, the player may not play against remote opponents, but the player may play against local opponents and/or an artificial intelligence of the video game system.

The gaming device may have a wireless connection device, such as, for example, a Wi-Fi network device, a wireless ZigBee device, an EnOcean device, an ultra-wideband device, a wireless Bluetooth device, a wireless Local Area Network (hereinafter LAN) accessing device, a wireless IrDA device and/or the like. The wireless connection device facilitates wireless game play against one or more opponents over a wireless communication network.

The fixed or wireless communication network includes a personal area network (PAN), a local area network (LAN), a campus area network (CAN), a Metropolitan area network (MAN) and/or a wide area network (WAN). Alternatively, the fixed network includes an optical fiber network, an Ethernet, a cabled network, a permanent network, a power line communication network, an intranet, extranet or the Internet which may include the world wide web. Moreover, the wireless network includes a wireless MAN, a wireless LAN, a wireless PAN, a Wi-Fi network, a WiMAX network, a global standard network, a personal communication system network, a pager-based service network, a general packet radio service, a universal mobile telephone service network, a satellite service network or a radio access network.

The gaming device has an input device to allow the player or the opponent(s) to control the movements, rotations and drops of the tetrimino blocks 14a-14g within the matrix 10. The input device includes a graphical user interface for the gaming device. Alternatively, the input device may include a touch screen, a stylus, a joystick, a keyboard, a cable remote, a mobile phone or the like.

The general objective of the video game is to eliminate as many tetrimino blocks 14a-14g and/or complete horizontal lines 12 before (a) the tetrimino blocks 14a-14g are pushed or moved above a buffer zone (not shown in the drawings) that is located directly above the matrix 10, (b) the tetrimino blocks 14a-14g are located in the buffer zone and prevent generation of a new block from the top of the buffer zone, or (c) expiration of a time limit. An opponent may send one or more incomplete horizontal lines 13 to the matrix 10 of the player, which may be added at the bottom 20 of the matrix 10 of the player. As a result, one or more tetrimino blocks 14a-14g within the matrix 10 or buffer zone may be pushed above the top of the matrix 10.

Alternative objectives of the video game include (a) eliminating a maximum number of complete horizontal lines 12 before expiration of a predetermined time limit or before an opponent completes a predetermined number of complete horizontal lines 12, (b) clearing all blocks 14a-14g from the matrix 10, (c) clearing a bottom incomplete horizontal line 14a-14g from the matrix 10, (d) clearing a pre-determined amount and/or assortment of blocks 14a-14g from the matrix 10, (e) clearing blocks 14a-14g and/or minos 16 such that a digitally animated character or avatar may reach the bottom 20 of the matrix 10, (f) organizing blocks 14a-14g to form a design or object, such as, for example, a pyramid, and (g) clearing blocks 14a-14g from a spherical matrix (not shown in the drawings) to reveal a core in the center of the matrix. The opponent(s) may be, for example, one or more other players and/or an artificial intelligence associated with the video game.

The matrix 10 is a digital grid having dimensions of, for example, ten (10) columns wide by twenty (20) rows high, eight (8) columns by twenty (20) rows, eight (8) columns by twelve (12) rows, five (5) columns by ten (10) rows or four (4) columns by ten (10) rows. The matrix 10 has the horizontal skyline 18 located at the top of the matrix 10 and a bottom 20 located opposite to the skyline 18 of the matrix 10. The buffer zone is separate from the matrix 10 and is located directly above the skyline 18. The buffer zone is positioned between the matrix 10 and where block generation and game ending conditions occur. The buffer zone has dimensions that are the same as or similar to the dimensions of the digital matrix 10. The buffer zone and/or tetrimino blocks 14a-14g located within the buffer zone may or may not be visible to the player.

Newly generated and introduced blocks 14a-14g fall from a top of the buffer zone at a point within the width of the matrix 10. Upon introduction into the buffer zone and/or the matrix 10, the current falling tetrimino block is in a falling phase whereby the player moves, rotates or drops the current falling tetrimino block within the matrix 10. The newly introduced tetrimino blocks 14a-14g may fall or move downward from the buffer zone and/or the skyline 18 to the bottom 20 of the matrix 10 at a fall speed, such as less than three (3) seconds per line, less then two (2) seconds per line or less than one (1) second per line.

Tetrimino blocks 14a-14g are one of seven different geometric shapes as shown in FIGS. 1 and 2. Each tetrimino block is a geometrically shaped block, such as, for example, an I-shape block 14a, a T-shape block 14b, a L-shape block 14c, a J-shape block 14d, a S-shape block 14e, a Z-shape block 14f or a O-shape block 14g. Optionally, each tetrimino block may be specific color based on the geometric shape of the blocks 14a-14g. The tetrimino blocks 14a-14g having different geometric shapes may be colored differently and/or may have different graphical patterns displayed thereon.

One or more tetrimino blocks 14a-14g may be positioned adjacent to each other to form a monster block (not shown in the figures) that is fused together and/or inseparable. For example, tetrimino blocks 14a-14g of the same color may be fused together after these tetrimino blocks 14a-14g are locked down adjacently to each other. Moreover, forming a complete horizontal line 12 with tetrimino blocks 14a-14g of the same color may destroy all of the tetrimino blocks 14a-14g of that color within the matrix 10.

With respect to the general objective of the puzzle video game, the player achieves a line clear by arranging, organizing and locking down the blocks 14a-14g into a complete horizontal line 12 which extends across the width of the matrix 10. The player may allow the tetrimino blocks 14a-14g to fall at the fall speed associated with a current difficulty level of the video game before locking the blocks down within the matrix 10. Alternatively, the player may perform a hard drop or a soft drop for one or more tetrimino blocks 14a-14g in the matrix 10. With hard drops, tetrimino blocks 14a-14g instantly drop straight down to the bottom 20 of the matrix 10 and lock down on the bottom 20 of the matrix 10 or a surface of one or more tetrimino blocks 14a-14g located below.

With soft drops, tetrimino blocks 14a-14g drop about 20 times faster than the fall speed associated with the current difficulty level and do not automatically lock down on the bottom 20 and/or the surface of tetrimino blocks 14a-14g located below. The player is given a predetermined amount of time, such as about 0.5 seconds to move and/or rotate the blocks 14a-14g after executing soft drops before the blocks 14a-14g are locked down. The video game system provides infinite spin which allows the player to perform up to fifteen (15) rotations of a tetrimino block after the tetrimino block has fallen onto a surface of another block or the bottom 20 of the matrix 10.

The player achieves a higher level by clearing a specific number of complete horizontal lines 12, such as, for example, about ten (10) or fifteen (15) line clears before one or more blocks extend into the skyline 18 of the matrix 10. The video game may award scoring and/or other bonuses for a number complete horizontal lines 12 cleared in one or more line clears, one or more special actions or back-to-back line clears. The video game provides animation which complements scoring achieved by the player.

After a line clear is achieved, incomplete horizontal lines 13 and/or tetrimino blocks 14a-14g located above the complete horizontal line 12 cleared from the matrix 10 collapse downward towards the bottom 20 of the matrix 10. A gravity or cascade feature of the video game may allows one or more minos 16 of the tetrimino blocks 14a-14g to separate and to fall downward as loose minos 16 to fill in one or more openings 22 below which may form one or more newly complete horizontal lines 12. As a result, newly formed complete horizontal lines 12 may additionally be cleared from the matrix 10. Alternatively, one or more minos 16 of a tetrimino block may not separate because the minos 16 therein are sticky minos 16 incapable of separating from each other.

As the difficulty levels of game play increases, the fall speed in which the tetrimino blocks 14a-14g increase by predetermined velocities. As a result, the fall speed of tetrimino blocks 14a-14g at, for example, Level 4 may be twice as fast as the fall speed of tetrimino blocks 14a-14g at Level 1. Thus, the player is afforded less time to arrange and organize the tetrimino blocks 14a-14g at higher Level 4 because the fall speed is twice as fast as the fall speed of tetrimino blocks 14a-14g at lower Level 1.

If the player fails to accomplish line clears at a speed substantially the same as or greater than the fall speed of newly introduced tetrimino blocks 14a-14g, the game play of the player may result in an occurrence of a game ending condition. A game ending condition, such as a block-out, may occur when existing blocks within the matrix 10 and/or buffer zone prevents or blocks a new tetrimino block from being generated and/or introduced into the matrix 10 or the buffer zone. Another game ending condition includes a lock-out which occurs when a portion of a tetrimino block is locked down above the buffer zone. Yet another game ending condition includes a top-out which may occur when a part of a tetrimino block is pushed or forced upward by one or more incomplete horizontal lines 13 that may be added at the bottom 20 of the matrix 10 by an opponent.

It is commonly known that the video game may include several play mode variations. For example, in marathon mode, the player is challenged by, for example, about fifteen (15) increasingly difficult levels of game play. In challenge or ultra mode, the player is challenged to score as many points or to clear as many complete horizontal lines blocks 12 in a specific duration of time, such as, for example, ten (10) minutes, three (3) minutes or (2) minutes. In sprint mode, the player is challenged to clear a specific number of lines, such as, for example, forty (40) lines in the shortest duration of time possible by the player. In cooperative mode, two or more players work together to achieve line clears within the same matrix 10. In target mode, the player must clear a predetermined number of target blocks or minos from a matrix 10 within a predetermined amount of time. In mission mode, the player must complete a mission, such as clearing two lines with, for example, a J-shaped block to achieve a higher level.

The video game includes a next queue box (not shown in the drawings) displayable to the player and/or opponent. The next queue box displays a next, upcoming block that is generated and introduced into the matrix 10 via the buffer zone. The next queue box displays any number of upcoming blocks to be generated and introduced into the matrix 10 via the buffer zone. The next queue box may be shared by a player and one or more opponents so that the next upcoming block displayed in the next queue box may be introduced into the matrix 10 of which every player or opponent is a first to lock down the current block falling within their matrix.

The video game includes a hold box (not shown in the drawings) which allows the player to hold and save one or more newly generated blocks from being introduced into the matrix 10 via the buffer zone. The player may swap a block held within the hold box with a newly generated block to introduce the block that was held within the hold box into the matrix 10 via the buffer zone. Alternatively, the player may, at any time, release the block that was held within the hold box into the matrix 10 via the buffer zone.

The video game includes a ghost piece (not shown in the drawings) located below the bottom 20 of the matrix 10, which is a copy of the current falling tetrimino block within the matrix 10 or buffer zone. The ghost piece indicates to the player where the current falling tetrimino block will come to rest in the matrix 10 if dropped from its current position. The ghost piece appears in or below the matrix 10 as a block outline or as a translucent "ghost" image of the block. The ghost piece has the same geometric shape as the current falling tetrimino block within the matrix 10 or buffer zone.

Prior to beginning game play of the video game, the player selects, for example, a number of players, a starting difficulty level and/or a mode of game play. The video game includes more than one difficulty level. For example, the video game may include difficulty levels ranging from 1 to 15, whereby difficulty level 1 is the least difficult and difficulty level 15 is the most difficult. Any number of players may be capable of playing the video game simultaneously, individually, in competition or in cooperation. The next queue box, hold queue box and ghost piece features are selectable or deselectable by the player at any time.

During game play, the video game displays information regarding a current game being played by the player via the digital display of the gaming device. The information includes the game mode, a number of line clears achieved, number of lines remaining to be cleared, a current difficulty level, a time elapsed, a time remaining, a current score, a high score, a player name and/or a player rank.

The player moves a current falling tetrimino block, within the matrix 10 or buffer zone, left, right and downward and/or rotates the current block clockwise or counterclockwise to position the current falling tetrimino block in the matrix 10. Each rotation of the block occurs at 90° intervals. The current falling block rotates via a digital rotation system that prioritizes possible rotations using five (5) rotation points of the block. If walls of the matrix 10 and/or locked down blocks in the matrix 10 prevent all five (5) rotations of the current falling tetrimino block, then the current falling tetrimino block is unable to be rotated.

The current falling tetrimino block is locked down into an unchangeable position after the current falling tetrimino block comes to rest on a surface of another tetrimino block or the bottom 20 of the matrix 10. The player may be allowed to rotate and/or move the current tetrimino block for a predetermined amount of moves, such as, for example, about fifteen (15) rotations, or for a predetermined amount of time, such as, for example, about 0.5 seconds after which the block is locked down.

After the current tetrimino block is locked down, the video game determines whether one or more complete horizontal lines 12 are present in the matrix 10. If so, the video game system clears the one or more complete horizontal lines 12 from the matrix, shifts remaining tetrimino blocks 14a-14g and incomplete horizontal lines 13 downward, adjusts any separated minos 16 from the cascade feature, reexamines the matrix 10 for additional newly complete horizontal lines 12 and clears any additional newly complete horizontal lines 12 from the matrix 10. If a complete horizontal line is not formed by locking down the current tetrimino block, then the video game generates and introduces a new block into the matrix 10 via the buffer zone.

Traditionally, the video game terminates game play for the player when the game play results in an occurrence of a game ending condition. The game ending condition occurs when (a) blocks are pushed or forced above the buffer zone of the digital matrix 10 by incomplete horizontal lines 13 being add at the bottom 20 of the matrix 10 (a top-out), (b) an entire block or a part of a block being locked down above the skyline 18 or buffer zone (a lock-out), and/or (c) a new block is prevented from being generated by an existing block that is locked down in a position where port of the new block would be generated (a block-out). Upon termination of the game play for the player, the video game displays the information related to the terminated game to the player.

Alternatively, game play of the player may not terminate an occurrence of a game ending condition. Instead of termination of game play upon occurrence of a game ending condition, the current tetrimino blocks 14a-14g within the matrix 10 are cleared from the matrix 10, game play is restarted and trimino blocks 24a, 24b are generated and introduced into the empty matrix 10 via the buffer zone. The trimino blocks 24a, 24b contain three minos 16 in each trimino block. When trimino blocks 24a, 24b are used in game play, tetrimino blocks 14a-14g are not in use during game play. The trimino blocks 24a, 24b fall at the same fall speed as the fall speed of the tetrimino blocks 14a-14g previously used in game play. If the player fails to form and clear complete horizontal lines with the trimino blocks 24a, 24b within the matrix 10, the game play of the player with the trimino blocks 24a, 24b may result in another occurrence of a game ending condition.

Upon occurrence of a subsequent game ending condition, the current trimino blocks 24a, 24b within the matrix 10 are cleared from the matrix 10, game play is restarted and dimino blocks 24c are generated and introduced into the empty matrix 10 via the buffer zone. The dimino blocks 24c contain two minos 16 in each dimino block. When dimino blocks 24c are used in game play, tetrimino blocks 14a-14g and trimino blocks 24a, 24b are not in use during game play. The dimino blocks 24c fall at the same fall speed as the fall speed of the tetrimino blocks 14a-14g and the trimino blocks 24a, 24b previously used in game play. If the player commits a subsequent game ending condition during game play with the dimino blocks 24c, the game play of the player is terminated.

The number of rows and/or columns of the matrix 10 adjusts based on whether the tetrimino blocks 14a-14g, the trimino blocks 24a, 24b or the dimino blocks 24c are being used during game play. The current blocks being used during game play are graphically expanded to change the number of rows and/or columns of the matrix 10 during game play. For example, the matrix 10 has ten (10) columns and twenty (20) rows for game play with the tetrimino blocks 14a-14g, seven (7) columns and fourteen (14) rows for game play with trimino blocks 24a, 24b, and five (5) columns and ten (10) rows for game play with dimino blocks 24c.

A novice player may play the video game and have difficulty forming complete horizontal lines 12 and/or clearing the blocks 14a-14g due to inexperience or an inability to move, rotate and/or drop the blocks 14a-14g to form complete horizontal lines 12. The inexperience and inability of the novice player causes the novice player to have a poor skill level or game play at one or more difficulty levels. As a result, the novice player may frequently commit and/or approach a game ending condition because of the inability of the novice player to generate sufficient complete horizontal lines 12. Typically, video games played by the novice player are of a short duration due to the poor skill level and game play of the novice player. As a result, the novice player may become frustrated with the video game and may resist subsequently playing the video game because of the short duration of the video games played by the novice player.

A need, therefore, exists for video game systems and methods for providing software-based skill adjustment mechanisms for video game systems which may provide software for one or more primary and secondary software-based skill adjustment mechanisms that adjust a difficulty level of the video game to correspond to a skill level and/or game play of a player. Further, a need exists for video game systems and methods for providing software-based skill adjustment mechanisms which may provide primary and secondary adjustments to lines, levels, fall speeds and/or geometric shapes of blocks for changing a difficulty level of the video game to correspond to a skill level and/or game play of a player. Still further, a need exists for video game systems and methods for providing software-based skill adjustment mechanisms which may reduce the frequency of or may prevent occurrences of game ending conditions committed by a player. Moreover, a need exists for video game systems and methods for providing software-based skill adjustment mechanisms which may prevent a player from becoming frustrated with game play of the video game by adjusting the difficulty level of the video game to correspond to the skill level and game play of the player. Furthermore, a need exists for video game systems and methods for providing software-based skill adjustment mechanisms which may provide unlimited game play for a player by preventing an occurrence of a game ending condition within a single game and without completely clearing digital blocks from a digital matrix

SUMMARY

The present disclose is related to video game systems and methods for providing one or more software-based skill adjustment mechanisms for video game systems. More specifically, the present disclosure is related to puzzle video game systems and methods for providing software-based skill adjustment mechanisms for video game systems to adjust a difficulty level of the puzzle video games based on a current, existing skill level or game play of a player. The difficulty level of the puzzle video games may be adjustable based on the player's current, existing skill level of solving the puzzle video game by removing a portion of digital blocks from a matrix, clearing a portion of digital lines from the matrix and/or avoiding game ending conditions. The difficulty level of the puzzle video game may be adjusted to correspond to the existing skill level of the player or to facilitate skill-building game play for the player within a single game play and without completely emptying a digital matrix during the game play. The difficulty level of the video games may be adjustable after an occurrence of a game ending condition or during game play to avoid an occurrence of a game ending condition.

The skill adjustment mechanisms may include, for example, matrix dimensions adjustments, line adjustments, level and fall speed adjustments, piece adjustments and/or a top-out, lock-out or block-out meter (hereinafter "the meter"). One or more skill adjustment mechanisms may be executed during a single game play by a player to prevent occurrence of a game ending condition during the single game play by the player. Additionally, one or more skill adjustment mechanisms may be executed before occurrence of a game ending condition to adjust the difficulty level of the video game without terminating and subsequently restarting the game play at an adjusted difficulty level.

With a matrix dimensions adjustment, the width and height dimensions of the matrix may be decreased such that formation of complete horizontal lines by the player may be easier. With a line adjustment, one or more incomplete horizontal lines may be automatically cleared from the bottom of the matrix and remaining lines may be shifted downward. However, a line adjustment may not completely clear the matrix. With a level and fall speed adjustment, the difficulty level may be decreased by one or more difficulty levels which may also decrease the fall speed of one or more blocks within the matrix. With a piece adjustment, a size, shape and/or configuration of one or more blocks may be adjusted so that forming complete horizontal lines may be easier to achieve by the player. The piece adjustment may provide first blocks having a first size, shape and/or configuration and second blocks having a second size, shape and/or configuration during game play thereafter. The meter may count a number of occurrences of the game ending condition or a number of difficulty level adjustments. Upon completely filling the meter, game play of the player may be terminated.

To this end, in an embodiment of the present invention, a method for providing software-based skill adjustments to a video game may be provided. Game-play of the video game may be conducted via a gaming device having a digital display and programmed with software for skill adjustment mechanisms, wherein game-play of the video game may be conducted at a current difficulty level. During game-play, digital blocks may move downwardly from a skyline of a digital matrix to a bottom of the digital matrix that is located opposite to the skyline, wherein digital blocks may be removed from the digital matrix by forming complete horizontal digital lines with the digital blocks within the digital matrix, wherein the digital blocks and digital matrix are displayable via the digital display of the gaming device. The method may include identifying that current game-play of the video game is approaching an occurrence of a game ending condition or that a game ending condition occurred. Further, the method may include executing software for a first skill adjustment mechanism chosen from the group consisting of a matrix adjustment, a line adjustment, a level and fall speed adjustment and a piece adjustment. The matrix adjustment may change dimensions of the digital matrix, wherein the line adjustment may remove at least one incomplete horizontal line from the digital matrix, wherein the level and fall speed adjustment may change a fall speed of one or more digital blocks, and further wherein the piece adjustment may change a size of one or more digital blocks. Still further, the method may include changing the video game from the current difficulty level to an adjusted difficulty level via the executed software for the first skill adjustment mechanism, wherein the adjusted difficulty level may be less difficult than the current difficulty level.

In an embodiment, the method may include selecting the first skill adjustment mechanism from the skill adjustment mechanisms based on the identified current game-play.

In an embodiment, the method may include continuing or restarting game-play of the video game at the adjusted difficulty level.

In an embodiment, the method may include increasing a count of a counter after the software for the skill adjustment mechanisms is executed by the gaming device.

In an embodiment, the method may include terminating game-play of the video game when the count of the counter is equal to a selected or preset number.

In an embodiment, the method may include identifying that subsequent game-play of the video game at the adjusted difficulty level is approaching an occurrence of a game ending condition or that a game ending condition occurred and executing software for a second skill adjustment mechanism.

In an embodiment, the method may include adjusting the video game from the adjusted difficulty level to an intermediate difficulty level, wherein the intermediate difficulty level is more or less difficult than the adjusted difficulty level.

In an embodiment, the skill adjustment mechanism may comprise the matrix adjustment.

In an embodiment, the skill adjustment mechanism may comprise the line adjustment.

In an embodiment, the skill adjustment mechanism may comprise the level and fall speed adjustment.

In an embodiment, the skill adjustment mechanism may comprise the piece adjustment.

In another embodiment, a video game system for providing software-based skill adjustments to game-play may be provided. Game-play may be conducted with digital blocks that move downward from a skyline of a digital matrix to a bottom of the digital matrix that is opposite to the skyline of the digital matrix, wherein complete horizontal digital lines may be formed with one or more digital blocks during game-play and may be removed from the digital matrix. The system may include a gaming device having a digital display that displays the digital blocks and the digital matrix for conducting game-play, wherein game-play is conducted at a current difficulty level via the gaming device. Further, the system may include software, for at least one skill adjustment mechanism, programmed into the gaining device, wherein the gaming device identifies when current game-play approaches a game ending condition or commits a game ending condition and executes software for a first skill adjustment mechanism based on the identified current game-play, wherein the executed software for the first skill adjustment mechanism changes the current difficulty level to an adjusted difficulty level that is less difficult than the current difficulty level. Moreover, the system may include wherein the first skill adjustment mechanism is selected from the group consisting of a matrix adjustment, a line adjustment, a level and fall speed adjustment and a piece adjustment, wherein the matrix adjustment changes dimensions of the digital matrix, wherein the line adjustment removes at least one incomplete horizontal line from the digital matrix, wherein the level and fall speed adjustment changes a fall speed of one or more digital blocks and further wherein the piece adjustment changes a size of one or more digital blocks.

In an embodiment, the system may include a meter displayed by the gaming device, wherein a counter for the meter is increased after the software is executed by the gaming device.

In an embodiment, the first skill adjustment mechanism may comprise the matrix adjustment.

In an embodiment, the first skill adjustment mechanism may comprise the line adjustment.

In an embodiment, the first skill adjustment mechanism may comprise the level and fall speed adjustment.

In an embodiment, the first skill adjustment mechanism may comprise the piece adjustment.

In an embodiment, the system may include means for changing the adjusted difficulty level to an intermediate difficulty level, wherein the intermediate difficulty level is more or less difficulty than the adjusted difficulty level.

In an embodiment, the system may include a parameter for game-play of the video game system, wherein the parameter is changeable via the gaming device and indicative of the current difficulty level or the adjusted difficulty level.

It is, therefore, an advantage of the present disclosure to provide video game systems and methods for providing software-based skill adjustment mechanisms for video game systems which may adjust a difficulty level of the video game during game play by a player to correspond to a skill level or game play of the player.

Another advantage of the present disclosure is to provide video game systems and methods for providing software-based skill adjustment mechanisms for video game systems which may avoid occurrences of game ending conditions during a single game play by a player.

And, another advantage of the present disclosure is to provide video game systems and methods for providing software-based skill adjustment mechanisms for video game systems which may reduce frustration of a player with the video game by adjusting a difficulty level of the video game based on a skill level of the player.

A further advantage of the present disclosure is to provide video game systems and methods for providing software-based skill adjustment mechanisms for video game systems which may facilitate skill-building game play by a player for increasing a skill level of the player during a single game play.

Moreover, an advantage of the present disclosure is to provide video game systems and methods for providing software-based skill adjustment mechanisms for video game systems which may adjust a difficulty level of the video game by eliminating lines, reducing fall speeds of blocks, changing geometric shapes of blocks and/or providing a top-out, lock-out and/or block-out meter.

And, another advantage of the present disclosure is to provide video game systems and methods for providing software-based skill adjustment mechanisms for video game systems which may executed primary and secondary skill adjustment mechanisms to achieve improved game play by a player during a single game play.

Yet another advantage of the present disclosure is to provide video game systems and methods for providing software-based skill adjustment mechanisms for video game systems which may reduce a fall speed of one or more blocks within a matrix to achieve improved game play by a player during a single game play.

Another advantage of the present disclosure is to provide video game systems and methods for providing software-based skill adjustment mechanisms for video game systems which may allow a player to approach one or more gaming ending conditions before the video game is terminated.

A still further advantage of the present disclosure is to provide video game systems and methods for providing software-based skill adjustment mechanisms for video game systems which may reduce a difficulty level to a lower difficulty level until a player is capable of achieving a goal associated with the lower difficulty level.

Yet another advantage of the present disclosure is to provide video game systems and methods for providing software-based skill adjustment mechanisms for video game systems which may introduce first blocks having a first size and second blocks having a second size for forming complete horizontal lines within a digital matrix.

Additional features and advantages of the present disclosure are described in, and will be apparent from, the detailed description of the presently preferred embodiments and from the drawings.

EMBODIMENTS

The present disclose is related to video game systems and methods for providing software-based skill adjustment mechanisms to video game systems for adjusting a difficulty level of a puzzle video game based on a current, existing skill level or game play of a player. During game play, tetrimino digital blocks 14a-14g (hereinafter "blocks 14a-14g"), comprised of four minos 16, may be introduced into a digital matrix 10 displayed via a digital display of by the gaming device for the video game system as shown in FIGS. 1 and 2. The player may manipulate and organize the falling blocks 14a-14g within the matrix 10, via an input device of the video game system, to form complete horizontal lines 12 which are cleared from the matrix 10. An initial difficulty level of the video game may have a goal which may be obtainable by the player prior to the player advancing to the next difficulty level. Failure by the player to remove the blocks 14a-14g from the matrix 10 in a timely fashion may result an increased possibility of an occurrence of a game ending condition.

During game play, the player may be unable to form and clear complete digital horizontal lines with the blocks 14a-14g within the matrix 10 as quickly as new blocks 14a-14g are introduced and descend downward from the skyline 18 towards a bottom 20 of the matrix 10 via the buffer zone. If the player does not possess the necessary or sufficient skill level to form and clear the complete horizontal lines 12 with the blocks 14a-14g within the matrix 10 at a speed that is equal to or greater than a fall speed of newly generated blocks 14a-14g introduced into the matrix 10, the matrix 10 may begin to fill up and/or be blocked with blocks 14a-14g and/or incomplete horizontal lines 13. If the player is incapable of achieving timely line clears after the blocks 14a-14g begin to fill the matrix 10, one or more blocks 14a-14g being introduced and/or locked down within the matrix 10 may begin approaching the skyline 18 of the matrix 10 or extend above the skyline 18 and into the buffer zone of the digital matrix. As a result of one or more blocks 14a-14g being located within the buffer zone of the digital matrix, the player may commit a game ending condition or may increase possibilities of committing or approaching a game ending condition.

After an occurrence of a game ending condition or as the game play by the player approaches a game ending condition, the video game system may execute software for one or more activated software-based skill adjustment mechanisms. Execution of the software for a software-based skill adjustment mechanism by the video game system may reduce the difficulty level of the video game to an adjusted difficulty level of the video game which may correspond to the current, existing skill level or game play of the player. The adjusted difficulty level of the video games may be based on the current, existing skill level or game play of the player to clear lines from the matrix 10, to avoid a game ending condition and/or to avoid game play that may approach a game ending condition. As a result, the game play by the player at the adjusted difficulty level may continue uninterrupted within single game play without restarting or terminating the game play. Single game play may refer to game play of the video game that is continuous and interrupted with delay or stoppage of game play by the player.

The video game system may include software and/or one or more algorithms for executing one or more primary and/or secondary software-based skill adjustment mechanisms for the video game systems during a single game play by the player. The primary and/or secondary software-based skill adjustment mechanisms may include, for example, a matrix dimensions adjustments, line adjustments, level and fall speed adjustments, piece adjustments and/or a top-out, lock-out or block-out meter (hereinafter "the meter"). After the video game system executes the software for a software-based skill adjustment mechanism, game play by the player may continue uninterrupted and continuous or may be restarted at the adjusted difficulty level. The adjusted difficulty level may have a goal which may be less difficult for the player to achieve than the goal of the initial difficulty level which was previously and/or potentially unobtainable by the player.

In embodiments, the primary skill adjustment mechanisms may include line adjustments and level and fall speed adjustments, and the secondary skill adjustment mechanisms may include matrix dimensions adjustments and piece adjustments. The achieve the adjusted difficulty level, the video game system may execute software for two primary skill adjustment mechanisms, a primary and a secondary skill adjustment mechanism, two primary and a secondary skill adjustment mechanism, or two primary and two secondary skill adjustment mechanisms. Moreover, the video game system may execute the software for one or more skill adjustment mechanisms without adjusting or changing the current blocks 14a-14g within the matrix 10 and/or without delay or interrupting game play by the player. As a result, the game play of the player after the video game system executes software for one or more skill adjustment mechanisms may be single uninterrupted and/or continuous game play.

If the player achieves the goal of the adjusted difficulty level or approaches the goal of the adjusted difficulty level, the video game system may increase the difficulty level of the video game to a higher difficulty level. In embodiments, the higher difficulty level of the video game that may be playable by the player may correspond to the initial difficulty level or an intermediate difficulty level that is between the initial difficulty level and the adjusted difficulty level. If the goal of the adjusted difficulty level is not achieved by the player and the player commits or approaches a subsequent game ending condition, game play of the video game by the player may be terminated.

Alternatively, the video game system may execute software for one or more subsequent primary and/or secondary software-based skill adjustment mechanisms to further adjust the difficulty level of the video game to a second adjusted difficulty level during the single game play by the player. If the difficulty level is adjusted to a second adjusted difficulty level via one or more primary and/or secondary software-based skill adjustment mechanisms, game play by the player may continue or be restarted by the video game. One or more subsequent occurrences or approaching occurrences of a game ending condition may terminate game play of the video game by the player. As a result, the single game play by the player may be terminated and the player may have to restart the video game for subsequent game play.

With respect to the matrix dimensions adjustment, the video game may adjust the dimensions of the matrix 10 to adjust the difficulty level of the video game. Software for a matrix dimensions adjustment may be executed by the video game system after the player commits or approaches a game ending condition. As a result, the video game may decrease the number of columns and/or rows within the matrix 10 to change the difficulty level of the video game to an adjusted difficulty level which may be based on and/or may correspond to the current, existing skill level and/or of the player. The game play by the player may be continuous and uninterrupted by the execution of the software for the matrix dimensions adjustment. Additionally, the current blocks 14a-14g within the matrix 10 may not be cleared, adjusted or moved by execution of the software for the matrix dimensions adjustment.

For example, the player may have initially selected a difficult level for the video game having a matrix 10 of twenty (20) rows by ten (10) columns. In embodiments, the matrix 10 may be a square matrix having dimensions, such as, for example, ten (10) rows by ten (10) columns, fourteen (14) rows by fourteen (14) columns and/or the like. It should be understood that the matrix 10 may be a square matrix having any square dimensions as known to one of ordinary skill in the art.

Alternatively, the matrix 10 may be initially preset or programmed to have a specific number of rows and/or columns. The game play by the player may result in the player committing or approaching a game ending condition, and the video game system may execute the software for the matrix 10 dimensions adjustment to change the difficulty level of the video game to an adjusted difficulty level. As a result, the software-based skill adjustment mechanisms of the video game may decrease the dimensions of the matrix 10 to adjusted dimensions, such as, for example, ten (10) rows by eight (8) columns. The adjusted dimensions of the matrix 10 and/or the corresponding adjusted difficulty level of the video game may allow the player to more easily form and clear complete horizontal lines 12. As a result, the player may be capable of accomplishing the goal associated with the adjusted difficulty level without committing or approaching a subsequent game ending condition.

With respect to the line adjustment, the video game system may eliminate one or more incomplete horizontal lines 13 and/or blocks 14a-14g within the existing and/or current matrix 10 to provide the player with open area within the matrix 10 to manipulate, move, rotate and/or drop one or more falling blocks 14a-14g for forming and clearing complete horizontal lines 12. The game play by the player may be continuous and uninterrupted by the execution of the software for the line adjustment. Additionally, one or more current blocks 14a-14g and/or incomplete horizontal lines within the matrix 10 may not be cleared by execution of the software for the line adjustment.

Software for a line adjustment may be executed by the video game system after the player commits or approaches a game ending condition. As a result, the video game system may automatically clear a specific and/or configurable number of incomplete horizontal lines 13 from the bottom 20 of the matrix 10 after committing or approaching a game ending condition to adjust the difficulty level of the video game to correspond to the current, existing skill level and game play of the player.

For example, the player may commit or approach a game ending condition and the video game system may execute software for a line adjustment to change the difficulty level of the video game. As a result, the software-based skill adjustment mechanisms of the video game may automatically remove one or more lines from the bottom 20 of the matrix 10, such as, for example, five (5) or less lines, ten (10) or less lines or fifteen (15) or less lines. By eliminating one or more incomplete horizontal lines 13 from the bottom 20 of the matrix 10, the matrix 10 provides open area for the player to manipulate one or more falling blocks 14a-14g to form and clear complete horizontal lines 12 more easily. As a result, the player may be capable of accomplishing the goal associated with the difficulty level of the video game without committing or approaching a subsequent game ending condition.

With respect to the level and fall speed adjustment, the video game may adjust the level and fall speed of one or more blocks 14a-14g falling within the matrix 10 to change the difficulty level of the video game to an adjusted difficulty level. Software for the difficulty level and fall speed adjustment may be executed by the video game system after the player commits or approaches a game ending condition. As a result, the video game may decrease the difficulty level of game play by a configurable number of levels to achieve an adjusted difficulty level. The game play by the player may be continuous and uninterrupted by the execution of the software for the level and fall speed adjustment. Additionally, the current blocks 14a-14g within the matrix 10 may not be cleared, adjusted or moved by execution of the software for the level and fall speed adjustment.

The video game system may not decrease the difficulty level below a preset or predetermined level, such as, for example, Level 1. As a result, the fall speed of one or more blocks 14a-14g may be decreased to an adjusted fall speed corresponding to a fall speed of the corresponding adjusted difficulty level. The adjusted level and fall speed of one or more blocks 14a-14g and the adjusted difficulty level may be based on and/or correspond to the current, existing skill level and game play of the player.

For example, the player may be playing the video game at an initial difficulty level, such as, for example, Level 3 wherein the fall speed of the blocks 14a-14g may be less than one (1) second per line. The player may commit or approach a game ending condition, and the video game system may execute level and fall speed adjustment software to change the difficulty level of the video game to an adjusted difficulty level. The software-based skill adjustment mechanisms software of the video game may decrease the level of the game play by one or more difficulty levels, such as, for example, two (2) difficulty levels to Level 1 wherein the fall speed of the blocks 14a-14g may be greater than one (1) second per line. The adjusted difficulty level having the adjusted fall speed of the video game may allow the player to more easily form and clear complete horizontal lines 12. As a result, the player may be capable of accomplishing the goal associated with the adjusted difficulty level without committing or approaching a subsequent game ending condition.

In embodiments, the adjusted difficulty level may provide one or more blocks 14a-14g falling at a first fall speed and one or more blocks 14a-14g falling at a second fall speed which may be less than the first fall speed. The software-based skill adjustment mechanisms of the video game system may determine that organizing or locking down one or more first type of blocks 14a-14g with the existing blocks of the matrix 10 is easier than with one or more second type of blocks 14a-14g. As a result, the video game system may drop the one or more first type of blocks at the first fall speed and the one or more second type of blocks at the second fall speed. The video game system may base the determination on size, shape and/or configuration of the first and second blocks 14a-14g, the matrix 10 and/or the current blocks 14a-14g within the matrix 10.

With respect to the piece adjustment, the video game may adjust a size and/or configuration of one or more adjusted blocks 24a-24c falling within the matrix 10 to change the difficulty level of the video game to an adjusted difficulty level. Initially, the falling blocks of the video game may be tetrimino blocks 14a-14g comprised of four minos 16. Software for the piece adjustment may be executed by the video game system after the player commits or approaches a game ending condition. As a result, one or more adjusted blocks 24a-24c may be trimino blocks 24a, 24b comprised of three minos 16, dimino blocks 24c comprised of two minos 16 or single minos 16 as shown in FIG. 2. The game play by the player may be continuous and uninterrupted by the execution of the software for the piece adjustment. Additionally, the current blocks 14a-14g within the matrix 10 may not be cleared, adjusted or moved by execution of the software for the piece adjustment.

The video game may decrease the difficulty level of game play by replacing new tetrimino blocks 14a-14g with one or more adjusted blocks 24a-24c comprised of less than four minos 16 to achieve the adjusted difficulty level for the video game. In embodiments, the video game system may introduce both tetrimino blocks 14a-14g and adjusted blocks 24a-24c comprised of less than four minos 16 into the matrix 10 during single game play. The one or more adjusted blocks 24a-24c may change the difficulty level of the video game to the adjusted difficulty level which may be based on and/or may correspond to the current, existing skill level and game play of the player.

With respect to the meter, the video game system may have software for providing the player with more than one opportunity to accomplish a goal associated with one or more difficulty levels before game play by the player is terminated. The video game may allow the player to commit or approach one or more game ending conditions before the video game terminates the single game play of the player. The meter may be provided by the video game system and may be displayed to the player via digital display of the gaming device. During a single game play, the meter software may track and record (a) one or more occurrences or approaching occurrences of game ending conditions (b) one or more changes made to the difficulty level of the video game, and/or (c) one or more executions of the software for the skill adjustment mechanisms. When the meter may be completely filled, the video game may terminate game play of the player immediately or after the player commits a subsequent game ending condition.

For example, the meter may permit the player to commit or approach committing more than one game ending condition, such as, for example, three (3) game ending conditions before the video game terminates the single game play by the player. Initially, the meter may be empty or may indicate that no game ending conditions have been committed or approached by the single game play of the player. After the player commits or approaches a game ending condition, the video game system may record the first occurrence of a game ending condition, the first execution of the software for the skill adjustment mechanisms with the meter software or the first changing to the adjusted difficulty for the video game. The video game system may add a mark, an indicator or a symbol to represent the occurrence or approaching of the first game ending condition or the execution of the software to the meter. Additional subsequent occurrences or approaches of game ending conditions and/or subsequent executions of the software are also recorded by the video game system with the meter software. The meter may become completely full after one or more subsequent occurrences of game ending conditions, such as, for example, after a third occurrence of a game ending condition. As a result, the video game system may identify that the meter is full and may terminate the single game play by the player. By providing the player with multiple opportunities to continue the single game play after committing or approaching a game ending condition without terminating the single game play, the player may be afforded more than one opportunity to form and clear complete horizontal lines 12 and/or accomplish a goal associated with the current or adjusted difficulty level of the video game. As a result, the player may not become frustrated by frequent game ending conditions and subsequent game restarting procedures after each and every game ending condition.

Figure 3:
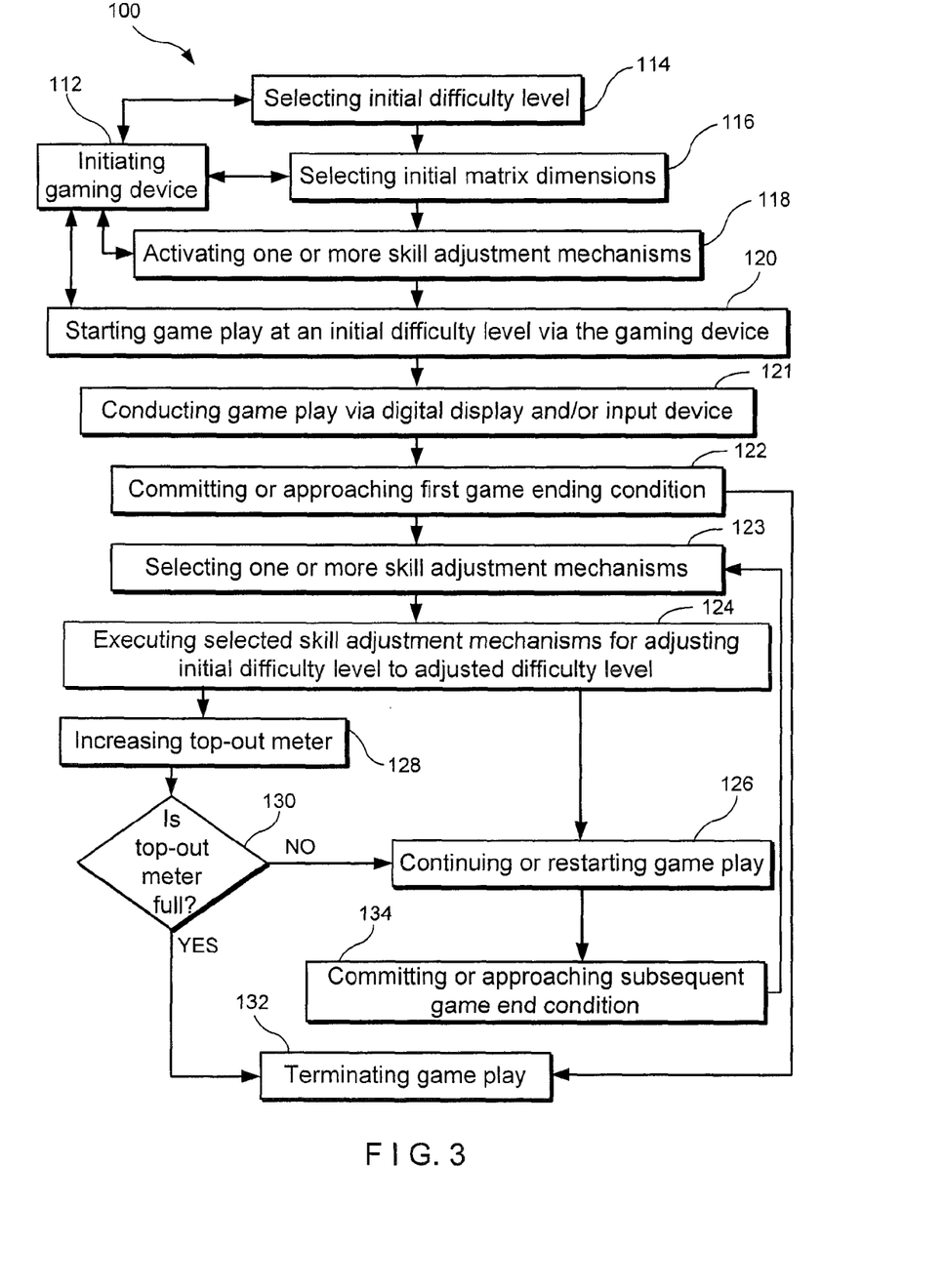
FIG. 3 illustrates a flow chart of a method for providing software-based skill adjustment mechanisms for video game systems in accordance with the present disclosure.

FIG. 3 illustrates a flow chart of a method 100 for providing software-based skill adjustment mechanisms for video game systems. After powering on the gaming device, the player may initiate the video game as shown at Step 112. The player may configure one or more parameters of the video game before beginning game play via the input device, the digital display and the software of the gaming device. For example, the player may select an initial difficulty level for game play as shown at Step 114. The video game may have multiple difficulty levels such that the player may select the initial difficulty level for game play from lower, intermediate or higher difficulty levels.

Further, the player may select initial dimensions for the matrix 10 of the video game as shown at Step 116. The initial dimensions may be selected from a range of widths from about four (4) columns to about twenty (20) columns and a range of heights from about ten (10) rows to about thirty (30) rows. The present disclosure should not be deemed as limited to a specific embodiment of the width and/or height dimensions of the matrix 10.

Moreover, the player may activate one or more primary and/or secondary software-based skill adjustment mechanisms for the video game as shown at Step 118. Subsequent to configuring one or more parameters of the video game, the player may start game play of the video game as shown at Step 120. Alternatively, the game may be pre-configured and the player may directly start game play without configuring the one or more parameters of the video game.

During game play of the video game, the player may commit or approach a first game ending condition as shown at Step 122. The first game ending condition may be an occurrence of a top-out, block-out or lock-out condition. The video game system may determine that the player may have committed a game ending condition or may be approaching a game ending condition. The video game system may, optionally, analyze the game play of the player to determine which of one or more primary and/or secondary software-based skill adjustment mechanisms may be executed to increase the skill level of the player and to avoid committing or approaching of subsequent game ending condition. The video game system may select one or more primary and/or secondary software-based skill adjustment mechanisms for execution based on the skill level and/or game play of the player as shown at Step 123. Alternatively, the video game system may be preset or preconfigured to select one or more primary and/or secondary software-based skill adjustment mechanisms to execute in a predetermined or programmable order. For example, the video game system may be programmed to select one or more primary and/or secondary software-based skill adjustment mechanisms in the following order: line adjustment; level and fall speed adjustment; matrix dimensions adjustment; and block adjustment.

After the video game system determines and selects one or more primary and/or secondary software-based skill adjustment mechanisms, the video game system may execute software for at least one activated primary and/or secondary software-based skill adjustment mechanisms as shown at Step 124. The one or more primary and/or secondary software-based skill adjustment mechanisms may include one or more matrix dimensions, line, level and fall speed and/or block adjustments. After execution of the one or more software-based skill adjustment mechanisms, game play of the video game by the player may continue uninterrupted or be restarted as shown at Step 126.

Optionally, if the meter software is activated, the video game system may increase the meter by an increment, such as, one (1) unit, as shown at Step 128. Subsequent to increasing the meter, the video game may determine if the meter is partially filled or completely filled as shown at Step 130. If the meter is partially full and not maximized, the game play of the video game by the player may continue or be restarted as shown at Step 126. If the meter is completely filled, the video game system may terminate single game play of the player as shown at Step 132. The player may have to initiate the video game again to proceed with subsequent game play after the termination as shown at Step 132.

During single game play subsequent to the execution of the first software-based skill adjustment mechanism, the player may commit or approach a second game ending condition as shown at Step 134. After the second game ending condition is committed or approached by the single game play of the player, the video game system may additionally select and/or execute software for one or more primary and/or secondary activated software-based skill adjustment mechanisms as shown at Step 124. Alternatively, game play by the player may be terminated by the video game after an occurrence of a second game ending condition as shown at Step 132. It should be understood that the video game system may allow the player to commit any number of game ending conditions and/or may execute software for any number of primary and/or secondary software-based skill adjustment mechanisms prior to terminating single game play of the video game by the player.

After the occurrence of the second game ending condition and execution of the software for the one or more software-based skill adjustment mechanisms, the video game system may optionally increase the meter by an increment as shown at Step 128. The video game may reexamine the meter to determine if the meter is partially full or completely full as shown at Step 130. If the meter is completely full the game play is terminated as shown at Step 132, and if the meter is partially full game play may continue or may be restarted as shown at Step 126. It should be understood that the video game system may continue single game play by the player until a number of game ending conditions committed or approached by the player completely fills or exceeds the number of game ending conditions permitted by the meter.

Figure 4A:
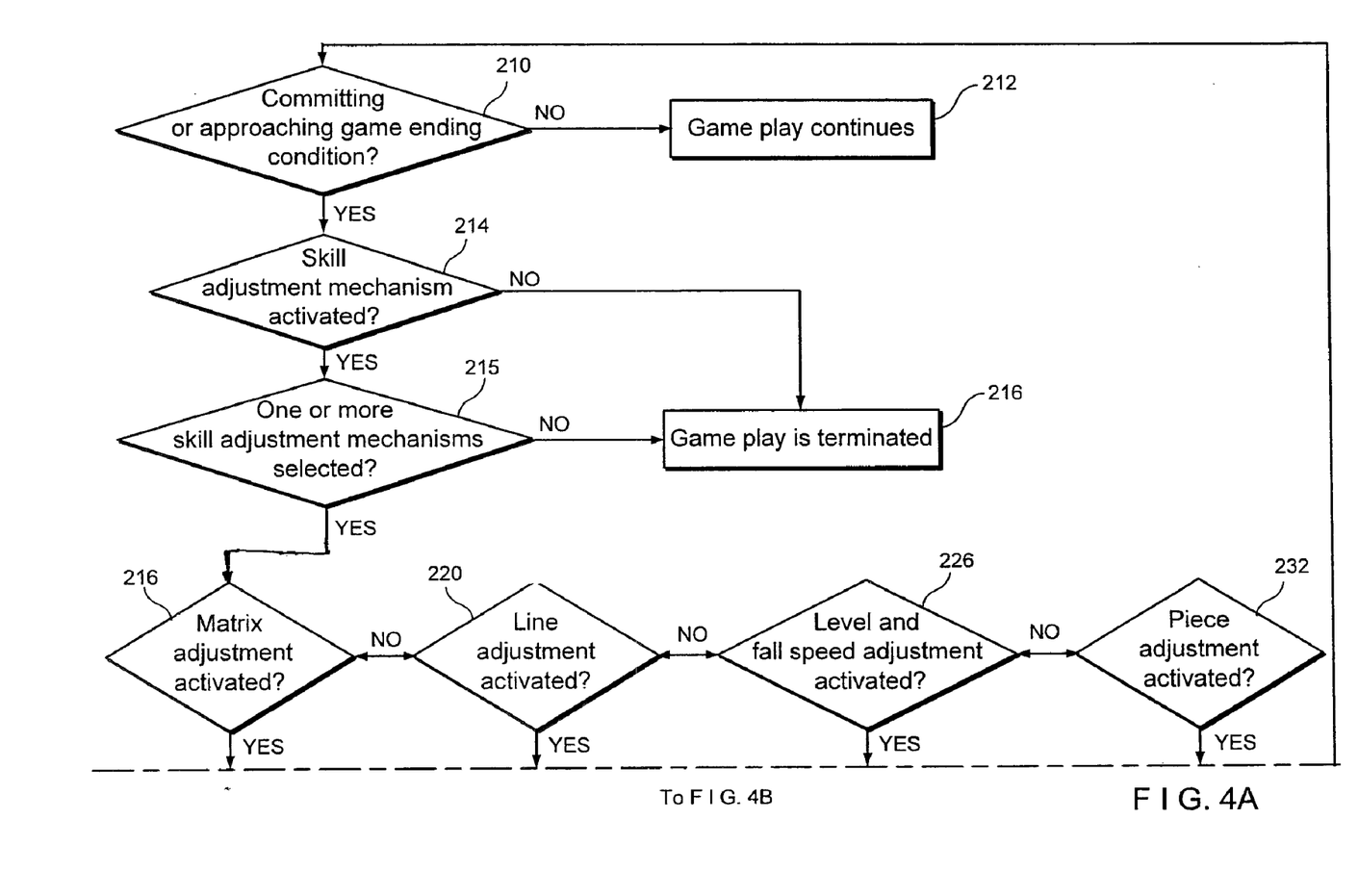
FIG. 4 illustrates a flow chart of a method for providing software-based skill adjustment mechanisms for video game systems in accordance with the present disclosure.
Figure 4B:
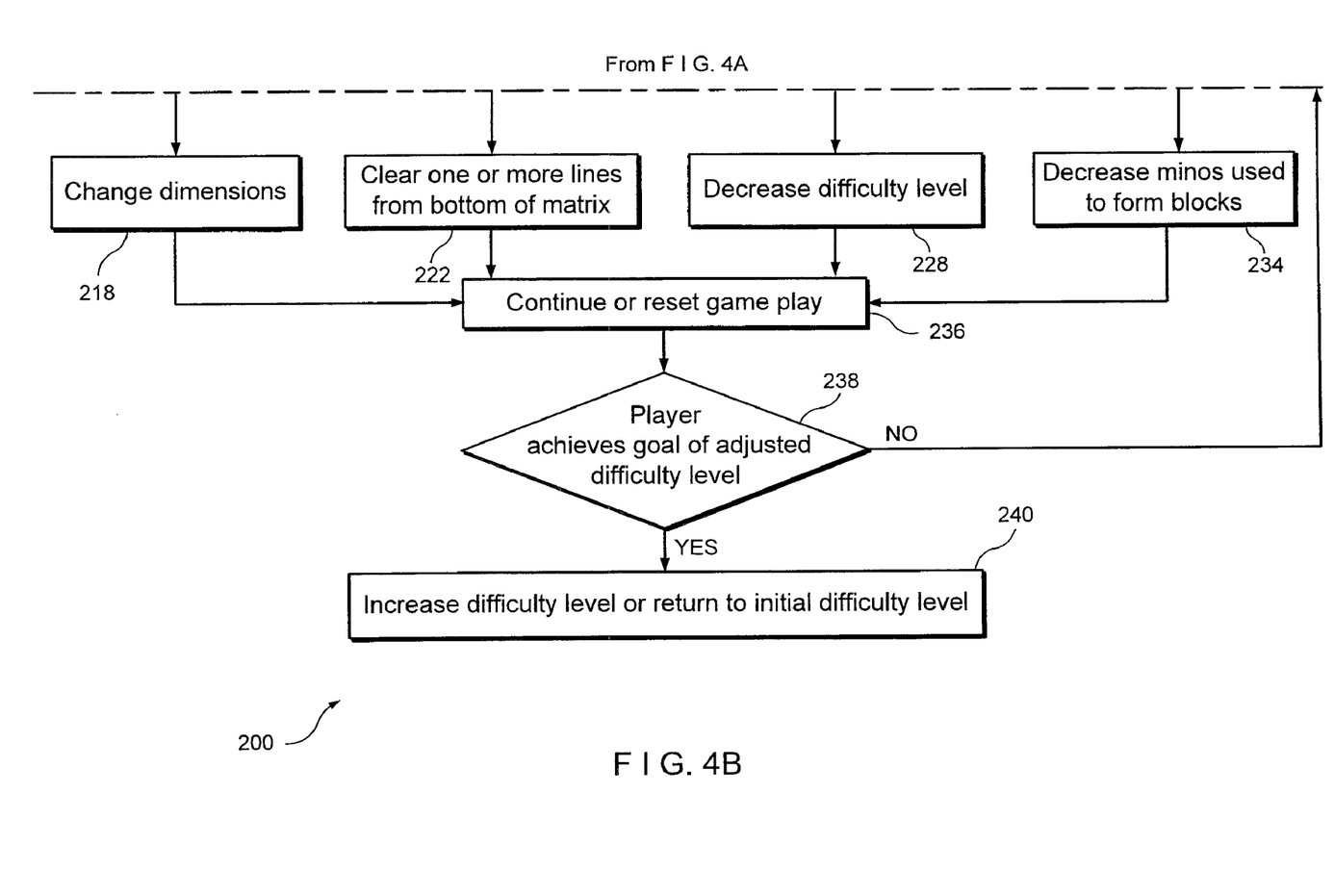

A method for providing one or more software-based skill adjustment mechanisms for video game systems with an initial difficulty level is shown in FIG. 4. During game play of the video game by the player, the video game system may determine whether a game ending condition has been committed or approached by the game play of the player as shown at Step 210. The player may timely form and clear complete horizontal lines 12 from the matrix 10 and may prevent committing or approaching an occurrence of a game ending condition. As a result, single game play by the player may continue until a game ending condition occurs or is approached as shown at Step 212. Alternatively, the player may fail to timely form and clear complete horizontal lines 12 with the falling blocks within the matrix 10. As a result, the player's skill level and/or game play may cause a game ending condition to be committed or approached.

After a game ending condition is committed or approached, the video game system may determine whether one or more primary and/or secondary software-based skill adjustment mechanisms are activated as shown at Step 214. Without one or more software-based skill adjustment mechanisms activated, committing or approaching an occurrence of a game ending condition may result in termination of single game play of the video game by the player as shown at Step 216. If one or more primary and/or secondary software-based skill adjustment mechanisms are activated, the video game system may determine which of the one or more software-based skill adjustment mechanisms are activated and may execute software for one or more activated software-based skill adjustment mechanisms for changing the initial difficulty level of the video game to an adjusted difficulty level of the video game. The video game system may select and execute one or more software-based skill adjustment mechanisms based on the skill level and/or game play of the player as shown at Step 215.

The video game system may determine whether the matrix dimensions adjustment is activated as shown at Step 216. If the matrix dimensions adjustment is not activated, the video game system may determine whether one or more other software-based skill adjustment mechanisms are activated. When the matrix dimensions adjustment is activated, the video game system may execute software for the matrix dimensions adjustment after a game ending condition is committed or approached. As a result, the initial dimensions of the matrix 10 may be changed to adjusted dimensions of the matrix 10 such that an adjusted difficulty level of the video game may correspond to the skill level and/or game play of the player as shown at Step 218.

The video game system may determine whether the line adjustment is activated as shown at Step 220. Without the line adjustment activated, and the video game system may determine whether other software-based skill adjustment mechanisms are activated. With the line adjustment being activated, the video game system may execute the line adjustment software. As a result, one or more incomplete horizontal lines 13 from the bottom 20 of the matrix 10 may be cleared without emptying or clearing the entirety of the matrix 10 as shown at Step 222. Subsequent to clearing the one or more incomplete horizontal lines 13 from the matrix 10, the remaining incomplete horizontal lines 13 and/or blocks may move downward towards the bottom 20 of the matrix 10 as shown at Step 224.

The video game system may determine whether the level and fall speed adjustment may or may not be activated as shown at Step 226. With the level and fall speed adjustment deactivated, the video game system may determine whether other software-based skill adjustment mechanisms are activated. With the level and fall speed adjustment software activated, the video game system may execute software for the level and fall speed adjustment after a game ending condition is committed or approached. The difficulty level of the video game may be decreased by one or more difficulty levels to achieve the adjusted difficulty level for the video game as shown at Step 228. As a result, the fall speed of the blocks 14a-14g, adjusted blocks 24a-24c and/or minos 16 may be reduced to correspond to the adjusted difficulty level.

The video game system may determine whether the piece adjustment is activated or not activated as shown at Step 232. With the piece adjustment deactivated, the video game system may determine whether one or more other software-based skill adjustment mechanisms are activated. Alternatively, the video game system may execute piece adjustment software so that the blocks 14a-14g, the adjusted blocks 24a-24c and/or the minos 16 are generated to achieve an adjusted difficulty level of the video game which may correspond to the skill level and/or game play of the player. As a result the player may more easily form and clear complete horizontal lines 12 as shown at Step 234.

Changing the difficulty level of the video game to the adjusted difficulty level via one or more primary and/or secondary software-based skill adjustment mechanisms may match the skill level and game play of the player to a difficulty level associated with the video game. As a result, the player may exhibit or achieve the necessary skill level and game play to form and clear complete horizontal lines 12 and accomplish the goal associated with the adjusted difficulty level without committing or approaching subsequent game ending conditions. After the difficulty level of the video game is changed to one or more adjusted difficulty levels, the game play by the player may continue or may be restarted by the video game as shown at Step 236.

The single game play of the player at the adjusted difficulty level of the video game may continue and the video game system may determine whether the player has achieved the goal associated with the adjusted difficulty level as shown at Step 238. If the video game system determines that the goal of an adjusted difficulty level has not been achieved by the player, then the video game system may return to the Step 210 for determining whether a game ending condition has been committed or approached by the single game play of the player.

Alternatively, the video game system may determine that the player has achieved the goal of the adjusted difficulty level. As a result, the video game system may increase the difficulty level of the video game to the initial difficulty level prior to the game ending condition being committed or approached or may change the difficulty level to an intermediate difficulty level between the adjusted difficulty level and the initial difficulty level as shown at Step 240.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

We claim:

1. A method for providing software-based skill adjustments to a video game, wherein game-play of the video game is conducted via a gaming device having a digital display and a non-transitory computer-readable storage medium on which software, for one or more skill adjustment mechanisms, is stored which enables the gaming device, after the software is loaded into the gaming device, to adjust a difficulty level of the video game based on game-play of the video game, wherein the game-play of the video game is being conducted at a current difficulty level, wherein, during the game-play, digital blocks move downwardly from a skyline of a digital matrix to a bottom of the digital matrix that is located opposite to the skyline, wherein digital blocks are removed from the digital matrix by forming complete horizontal digital lines with the digital blocks within the digital matrix, wherein the digital blocks and digital matrix are displayed via the digital display of the gaming device, the method comprising:

causing the gaming device to identify an approaching occurrence of a game ending condition based on the current game play of the video game;

causing the gaming device to execute at least one of the one or more skill adjustment mechanisms based on the approaching occurrence of the game ending condition, wherein the one or more skill adjustment mechanisms comprises at least one of a line adjustment and a piece adjustment, wherein the line adjustment, when executed by the gaming device, removes at least one incomplete horizontal line from the bottom of the digital matrix, wherein the piece adjustment, when executed by the gaming device, changes a size of one or more digital blocks; and causing the gaming device to change the video game, during the game play, from the current difficulty level to an adjusted difficulty level, wherein the adjusted difficulty level is less difficult than the current difficulty level.

2. The method according to claim 1, wherein the game-play of the video game is continuous and uninterrupted by the execution of at least one of the one or more skill adjustment mechanisms.

3. The method according to claim 1, further comprising:
causing the gaming device to increase a count of a counter after at least one of the one or more skill adjustment mechanisms is executed by the gaming device.

4. The method according to claim 3, further comprising:
causing the gaming device to terminate the game-play of the video game when the count of the counter is equal to a selected or preset number.

5. The method according to claim 1, further comprising:
causing the gaming device to terminate game-play of the video game after an occurrence of a subsequent game ending condition.

6. The method according to claim 1, further comprising:
causing the gaming device to identify an approaching occurrence of a subsequent game ending condition based on subsequent game-play of the video game at the adjusted difficulty level; and
causing the gaming device to execute at least one of the one or more skill adjustment mechanisms.

7. The method according to claim 1, further comprising:
causing the gaming device to adjust the video game from the adjusted difficulty level to an intermediate difficulty level, wherein the intermediate difficulty level is more difficult than the adjusted difficulty level.

8. The method according to claim 1, wherein executing at least one of the one or more skill adjustment mechanisms does not clear all existing digital blocks, located within the digital matrix, from the digital matrix.

9. The method according to claim 1, wherein the one or more skill adjustment mechanisms further comprises a level and fall speed adjustment, wherein the level and fall speed adjustment, when executed by the gaming device, changes a fall speed of one or more digital blocks within the digital matrix.

10. The method according to claim 9, wherein the adjusted difficulty level is achieved by causing the gaming device to execute at least two of the one or more skill adjustment mechanisms.

11. A video game system for providing software-based skill adjustments to game-play, wherein game-play is conducted with digital blocks that move downward from a skyline of a digital matrix to a bottom of the digital matrix that is located opposite to the skyline of the digital matrix, wherein complete horizontal digital lines are formed with one or more digital blocks during game-play and are removed from the digital matrix, the system comprising:
a gaming device having a digital display that displays the digital blocks and the digital matrix during game-play, wherein game-play is conducted at a current difficulty level via the gaming device, and
a non-transitory computer-readable storage medium on which software, for one or more skill adjustment mechanisms, is stored which enables the gaming device, after the software is loaded into the gaming device, to adjust a difficulty level of the video game based on the game-play of the video game, wherein the gaming device is configured to identify an approaching game ending condition based on current game play and execute at least one of the one or more skill adjustment mechanisms based on the approaching game ending condition, wherein the one or more skill adjustment mechanisms, when executed, changes the current difficulty level, during the game play, to an adjusted difficulty level that is less difficult than the current difficulty level, wherein the one or more skill adjustment mechanisms comprises a line adjustment and a piece adjustment, wherein the line adjustment, when executed by the gaming device, removes at least one incomplete horizontal line from the bottom of the digital matrix, and further wherein the piece adjustment, when executed by the gaming device, changes a size of one or more digital blocks.

12. The video game system according to claim 11, further comprising:
a meter displayed by the gaming device via the digital display, wherein a counter for the meter is increased after at least one of the one or more skill adjustment mechanisms is executed by the gaming device.

13. The system according to claim 11, wherein the game play is continuous and uninterrupted by the execution of at least one of the one or more skill adjustment mechanisms.

14. The system according to claim 11, further comprising:
means for changing the adjusted difficulty level to an intermediate difficulty level, wherein the intermediate difficulty level is more difficult than the adjusted difficulty level.

15. The video game system according to claim 11, wherein the one or more skill adjustment mechanisms further comprises a level and fall speed adjustment, wherein the level and fall speed adjustment, when executed by the gaming device, changes a fall speed of one or more digital blocks within the digital matrix.

16. A method for providing software-based skill adjustments to a video game, wherein game-play of the video game is conducted via a gaming device having a digital display and a non-transitory computer-readable storage medium on which software, for one or more skill adjustment mechanisms, is stored which enables the gaming device, after the software is loaded into the gaming device, to adjust a difficulty level of the video game based on the game-play of the video game, wherein the game-play of the video game is being conducted at a current difficulty level, wherein, during the game-play, digital blocks move downwardly from a skyline of a digital matrix to a bottom of the digital matrix that is located opposite to the skyline, wherein digital blocks are removed from the digital matrix by forming complete horizontal digital lines with the digital blocks within the digital matrix, wherein the digital blocks and digital matrix are displayed via the digital display of the gaming device, the method comprising:
causing the gaming device to identify an approaching occurrence of a game ending condition based on the current game play of the video game;
causing the gaming device to automatically execute, when the game ending condition occurs, at least one of the one or more skill adjustment mechanisms, wherein the one or more skill adjustment mechanisms comprises at least one of a line adjustment, a piece adjustment and a level and fall speed adjustment, wherein the line adjustment, when executed by the gaming device, removes at least one incomplete horizontal line from the bottom of the digital matrix, wherein the piece adjustment, when executed by the gaming device, changes a size of one or more digital blocks, and further wherein the level and fall speed adjustment, when executed by the gaming device, changes a fall speed of one or more digital blocks; and
causing the gaming device to change the video game, during the game play, from the current difficulty level to an adjusted difficulty level, wherein the adjusted difficulty level is less difficult than the current difficulty level.

17. The method according to claim 16, wherein the game-play of the video game is continuous and uninterrupted by the execution of the at least one of the one or more skill adjustment mechanisms.

18. The method according to claim 16, further comprising: causing the gaming device to increase a count of a counter after the at least one of the one or more the skill adjustment mechanisms is executed by the gaming device.

19. The method according to claim 18, further comprising: causing the gaming device to terminate game-play of the video game when the count of the counter is equal to a selected or preset number.

20. The method according to claim 16, further comprising: causing the gaming device to adjust the video game from the adjusted difficulty level to an intermediate difficulty level, wherein the intermediate difficulty level is more difficult than the adjusted difficulty level.

21. The method according to claim 16, wherein executing the at least one of the one or more skill adjustment mechanisms does not clear all existing digital blocks, located within the digital matrix, from the digital matrix.

22. The method according to claim 16, wherein the adjusted difficulty level is achieved by causing the gaming device to execute at least two of the one or more skill adjustment mechanisms.

* * * * *

UNITED STATES PATENT AND TRADEMARK OFFICE
CERTIFICATE OF CORRECTION

PATENT NO. : 8,313,370 B2  
APPLICATION NO. : 12/550854  
DATED : November 20, 2012  
INVENTOR(S) : Rogers et al.

It is certified that error appears in the above-identified patent and that said Letters Patent is hereby corrected as shown below:

In the Specification

Column 6, line 61, "port" -- should read -- part --.

Column 10, line 19, "gaining" -- should read -- gaming --.

Signed and Sealed this  
Fifth Day of August, 2014

Michelle K. Lee  
*Deputy Director of the United States Patent and Trademark Office*